March 28, 1967     G. E. BARKER     3,311,834

TIME PROPORTIONING CONTROL CIRCUITS

Filed Nov. 13, 1963     5 Sheets-Sheet 1

INVENTOR.
GEORGE E BARKER
BY *Robert J. Schaap*
ATTORNEY

March 28, 1967
G. E. BARKER
3,311,834
TIME PROPORTIONING CONTROL CIRCUITS
Filed Nov. 13, 1963
5 Sheets-Sheet 2
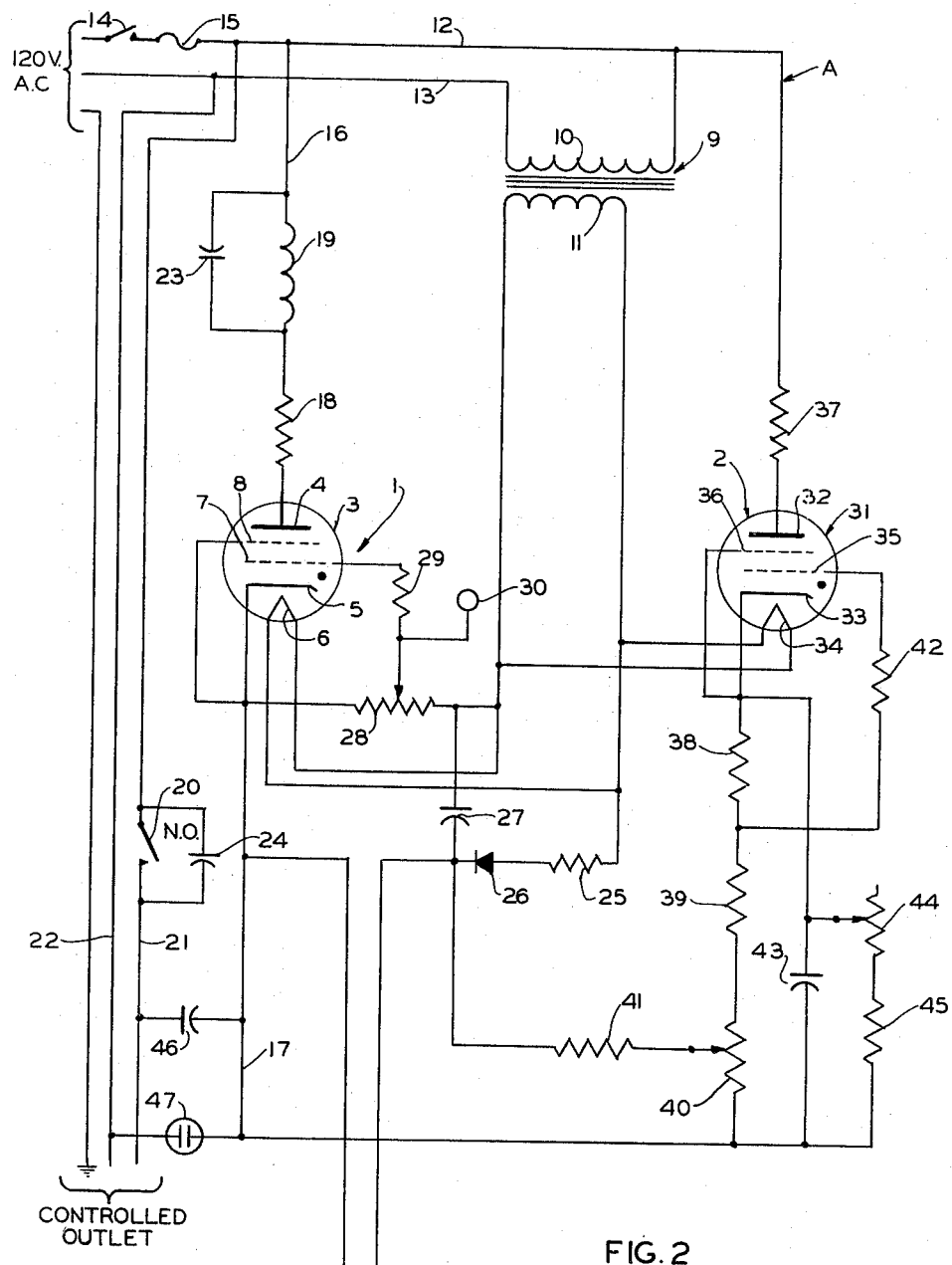
FIG. 2
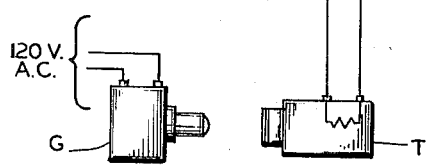
INVENTOR.
GEORGE E. BARKER
BY
*Robert J. Schaap*
ATTORNEY March 28, 1967     G. E. BARKER     3,311,834
TIME PROPORTIONING CONTROL CIRCUITS
Filed Nov. 13, 1963     5 Sheets-Sheet 3
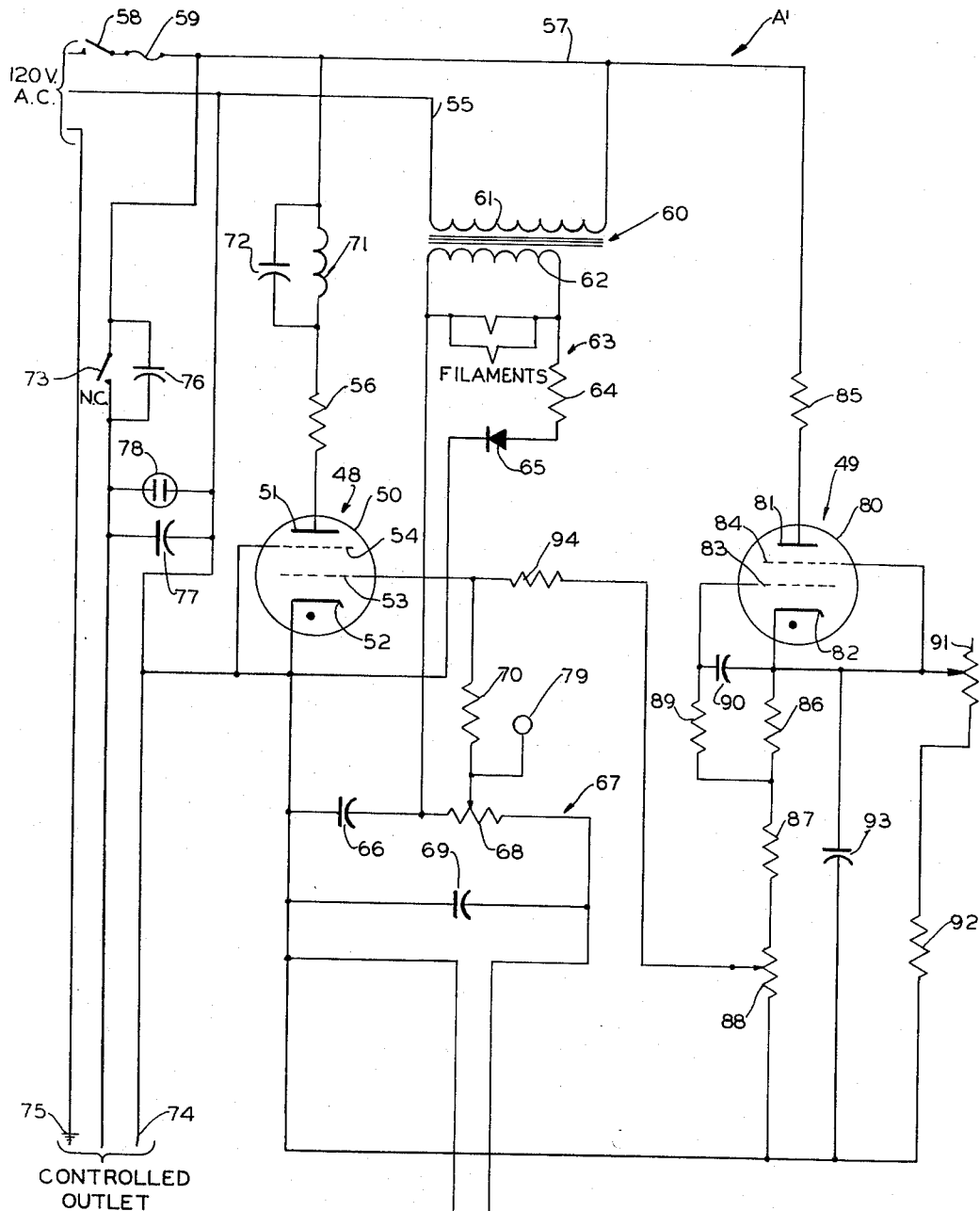
FIG. 3
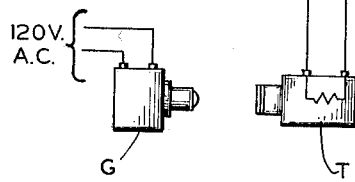
INVENTOR.
GEORGE E. BARKER
BY
Robert J. Schaap
ATTORNEY March 28, 1967 G. E. BARKER 3,311,834
TIME PROPORTIONING CONTROL CIRCUITS
Filed Nov. 13, 1963 5 Sheets-Sheet 4

INVENTOR.
GEORGE E. BARKER
BY Robert J. Schaap
ATTORNEY

March 28, 1967  G. E. BARKER  3,311,834
TIME PROPORTIONING CONTROL CIRCUITS
Filed Nov. 13, 1963  5 Sheets-Sheet 5

PERCENT OF "ON" TIME
AS A FUNCTION OF
LIQUID LEVEL

INVENTOR.
GEORGE E. BARKER
BY Robert J. Schaap
ATTORNEY

United States Patent Office 3,311,834
Patented Mar. 28, 1967

3,311,834
TIME PROPORTIONING CONTROL CIRCUITS
George E. Barker, St. Louis, Mo., assignor to Monsanto Company, a corporation of Delaware
Filed Nov. 13, 1963, Ser. No. 323,383
26 Claims. (Cl. 328—1)

This invention relates in general to certain new and useful improvements in liquid level controllers, and more particularly, level controllers which are capable of time proportioning action.

It has long been recognized that a need exists for a precise liquid level control device, particularly in the chemical industry where it is desired to control and maintain constant liquid levels for given time intervals. This need is particularly pronounced in bench scale and pilot plant operations where accurate test data is sought. The accuracy of level control in a chemical reactor, for example, is directly related to the degree of reaction which takes place in most cases, and consequently, wide variations in liquid levels within the reactor will produce faulty test data.

It is, therefore, the primary object of the present invention to provide a liquid level control which is capable of rendering time proportioning action.

It is another object of the present invention to provide a liquid level controller of the type stated having an infinitely variable cycle time, thereby permitting use on vessels having fast or slow liquid level changes.

It is a further object of the present invention to provide a liquid level controller of the type stated which does not restrict the vessel on which it is used to precise valve settings.

It is also an object of the present invention to provide a liquid level controller of the type stated which is adaptable for use in bench scale and pilot plant equipment.

It is another salient object of the present invention to provide a liquid level controller of the type stated which has a continuously adjustable cycle time and proportional band so that the controller can be used in a wide variety of liquid containing equipment.

It is still another object of the present invention to provide a liquid level controller of the type stated which can be built in a small compact unit, which is relatively inexpensive to manufacture, and has a high degree of reliability.

With the above and other objects in view, my invention resides in the novel features and form, construction, arrangement, and combination of parts presently described and pointed out.

In the accompanying drawings:

FIGURE 2 is a schematic view of the electrical circuitry forming part of the time proportioning liquid level controller constructed in accordance with and embodying the present invention;

FIGURE 3 is a schematic view of the electrical circuitry of a modified form of a liquid level controller, also constructed in accordance with and embodying the present invention;

Figure 1:
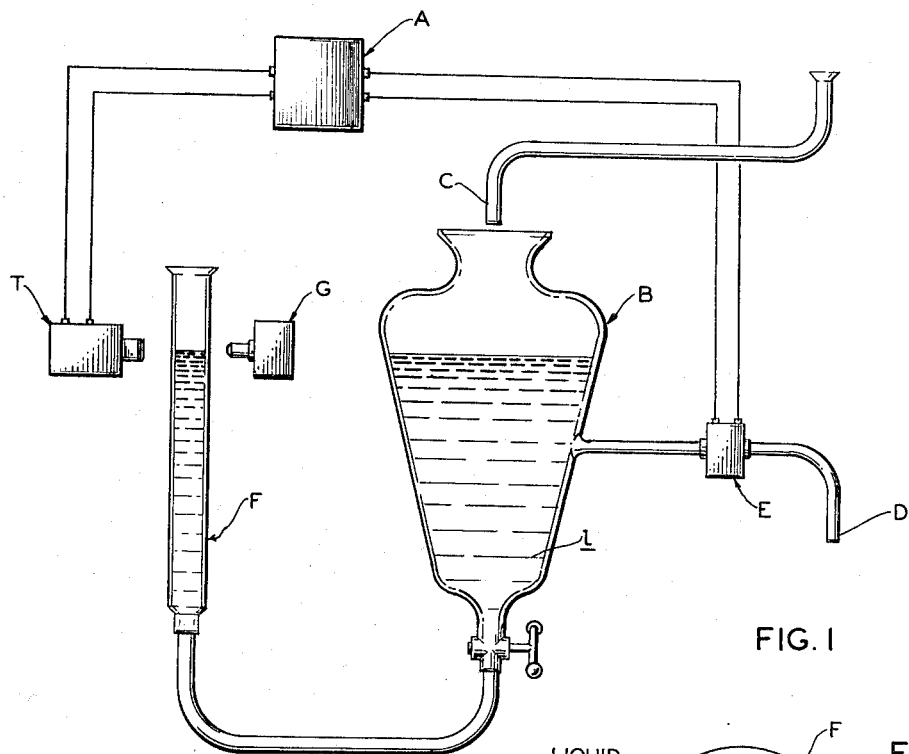
FIGURE 1 is a schematic view of a time proportioning liquid level control system employing a liquid level controller constructed in accordance with and embodying the present invention, and showing the functional connection to typical pilot plant equipment.

Generally speaking, the liquid level controller of the present invention includes a light sensitive transducer which senses the level of liquid in a liquid bearing vessel. The transducer relays a signal to a control circuit which, in turn, opens and closes a valve, the latter being actuable upon receipt of a signal from the control circuit. The valve is, in turn, connected to the liquid bearing vessel for regulating the level of liquid therein. The control circuit of the present invention is also designed to provide false signals to the valve in order to maintain rapid pulse action and therefore more constant liquid level control within the vessel.

Referring now in more detail and by reference characters to the drawings which illustrate practical embodiments of the present invention, A designates a time proportioning liquid level controller which is designed to control the liquid level in a liquid bearing vessel B which is continuously fed with a liquid $l$. The vessel B may be continuously fed at varying rates or intermittently fed through a liquid inlet line C which is, in turn, hydraulically connected to a suitable source of liquid $l$, such source not being shown.

The vessel B is also provided with a liquid drain or outlet line D withdrawing liquid from the vessel B and interposed in the outlet line D is a solenoid actuated valve E, the latter being conventional in its construction and is neither illustrated nor described in detail herein. The vessel B is also hydraulically connected to a liquid level indicating tube F which may be in the form of a sight glass mounted on the exterior surface of the vessel B.

Mounted on diametrally opposite sides of the liquid level indicating tube F in approximate alignment with the desired liquid level to be maintained in the vessel B, is a conventional light source G and a light sensitive transducer T.

The liquid level controller A is schematically shown in FIGURE 2, and includes a control circuit 1 and a pulse circuit 2. The control circuit 1 includes a 2D21 thryatron control tube 3. The tube 3 includes an anode 4, a cathode 5, a filament 6 for heating the cathode 5, a control grid 7 and a suppressor grid 8. The control circuit 1 is also provided with a voltage reduction transformer 9, which includes a primary winding 10, and a secondary winding 11, and which is designed to reduce 120 volt A.C. current to 6.3 volts A.C. current. The primary winding 10 is electrically connected to a suitable source of alternating electrical current (not shown) through a pair of lead lines 12–13, the line 13 serving as a neutral lead. The secondary winding 11 is directly connected to the filament 6 of the control tube 3 for applying 6.3 volt alternating current thereto. Interposed within one of the lead lines 12, and preferably mounted in the control panels of the housing (not shown) is an off-on switch 14 and a fuse 15.

The anode 4 of the tube 3 is connected to a conductor 16 which is ultimately connected to the lead line 12 and the cathode 5 is connected to a conductor 17 which in turn is ultimately connected to the lead line 13, as schematically shown in FIGURE 2. Interposed in the conductor 16 is a limiting resistor 18 which protects the tube 3 and a relay coil 19, which is disposed in proximate relation to and operates a set of relay control contact points 20. The contact points 20 are mounted in a controlled outlet line 21, which is connected to lead line 12. The controlled outlet line 21 and a second line 22, which is connected to the neutral lead 13 are then electrically connected to the solenoid actuated valve E, for actuating the latter. A capacitor 23 is connected across the relay coil 19 is parallel therewith and prevents chattering of the relay coil 19, and is further designed to provide operation at lower current values. A capacitor 24 connected across the controlled outlet line 21 in parallel with the contact points 20 prevents arcing of the points 20.

The grid 7 of the control tube 3 is provided with a bias voltage through electrical connection to the secondary winding 11 of the transformer 9. The A.C. current from the secondary winding 11 is rectified through a fixed resistor 25, a diode 26, and a capacitor 27, all of which are connected in series with the secondary winding 11. The D.C. voltage which is produced in the aforementioned rectifying circuit, is then passed through a half bridge, which consists of a reset potentiometer 28 connected to the cathode 5 and a limiting resistor 29 connected to the control grid 7, in the manner as schematically shown in FIGURE 2. Electrically connected to the movable element of the reset potentiometer 28 is a test outlet 30 which is designed to accommodate voltage reading devices such as vacuum tube volt meters.

Figure 5:
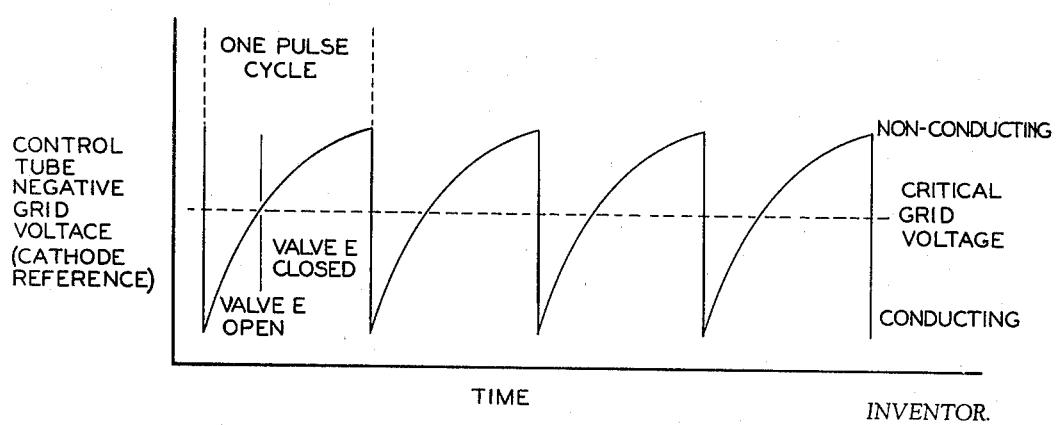
FIGURE 5 is a plot of the wave form of the grid-cathode voltage of a control tube forming part of the controller of FIGURE 2 as a function of time.

The polarity of the control tube 3 is such that the grid is more negative than the cathode, as illustrated by FIGURE 5 showing the plot of the control tube grid voltage versus time. A constant D.C. voltage is produced by the rectifying circuit consisting of the resistor 25, the diode 26 and the capacitor 27, which are connected in series as shown in FIGURE 2. This relatively constant D.C. voltage is imposed across the control grid 7 and the cathode 5, thereby creating a D.C. bias voltage across the control tube 3. The bias voltage across the tube 3 is affected by changes in radiation intensity on the light sensitive transducer T, which is in turn electrically connected to the aforementioned rectifying circuit, as shown in FIGURE 2. In this connection, it should be understood that a suitable source of D.C. current such as a battery could be employed. However, since the voltage reduction transformer 9 is used to supply alternating current voltage to the filament of the control tube 3, this source is also conveniently employed to provide a D.C. bias voltage.

It has been found in connection with the present invention that much better control is obtained if a D.C. bias is impressed across the grid 7 of the tube 3, rather than the A.C. bias. It has been found that a considerable amount of noise which occurred in the presence of an A.C. bias has been reduced with a D.C. bias, and that more sensitive level control resulted.

When the light sensitive transducer T is exposed to a high light intensity, the resistance, thereof drops and increases the current through the bridge, that is the reset potentiometer 28 and thereby creates a higher negative voltage differential between the grid 7 and the cathode 5. When the control grid 7 has a higher negative voltage than the critical voltage of the control tube 3, the tube 3 will not conduct.

Figure 7:
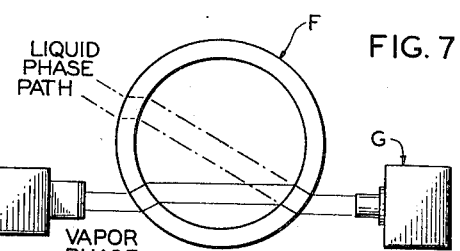
FIGURE 7 is a diagrammatical view showing electromagnetic emission passing through a liquid and vapor phase in a sight tube forming part of the present invention.

The operation of the light sensitive transducer T and the light source G is more fully illustrated in FIGURE 7. The light sensitive transducer is located in such a position, that when light from the source G, which preferably passes a single columnated emission of light, passes through the vapor phase of the tube F, this light source will strike the transducer T. A difference in the refractive index of liquid phase and the gas phase of material in the tube F is used to shift the beam of light from the light source G onto or away from the transducer T. The transducer T is preferably of the type where the resistance changes responsive to the light intensity directed thereon, such as a cadmium sulfide cell. By reference to FIGURE 2, it can be seen that the amount of light which is incident upon the transducer T affects the firing of the control tube 3. In normal operation, the beam of light from the source G will pass through the wall of the sight glass tube F and refract at a particular angle through the vapor phase, if the liquid is below the lower margin of the transducer T therefore the light will follow the path of the solid lines in FIGURE 7. When the columnated light beam passes through the vapor phase, the light will be incident upon the transducer T, thereby lowering the resistance of the transducer T. This will create a large negative voltage differential between the grid 7 and cathode 5 of the control tube 3, thereby preventing the firing of the control tube 3. If the liquid level should rise above the upper margin of the transducer T, light will shift from the vapor phase and pass through the liquid phase, thereby following the path of the dotted lines shown in FIGURE 7, where it will be shifted away from the transducer T. The increased resistance in the transducer T caused by the shifting of the light beam, will lower the negative voltage differential between the grid 7 and the cathode 5, thereby permitting actuation of the control tube 3. While the difference in the refractive index between a liquid and gas phase is used to shift the light beam onto or away from the transducer T, it should be understood that the transducer T can be operated through any conventional system, such as the use of an opaque liquid within the tube F, or a colored float which is disposed within the tube F and shifts according to the liquid level within the vessel B.

The pulse circuit 2 comprises a 2D21 thyratron pulse tube 31, which includes an anode 32, a cathode 33, a filament 34, a control grid 35 and a suppressor grid 36. The pulse tube 31 is connected across the lead line 12 and the neutral line 13, and the filament 34 thereof is connected across the secondary winding 11 of the transformer 9 for heating the cathode 33. Interposed between the anode 32 and the lead line 12, is a limiting resistor 37, which is similar to the limiting resistor 18, and protects the tube 31 from the high current value in the line 12 during the firing of the tube 31. Similarly interposed between the cathode 33 and the neutral line 13 are a pair of fixed resistors 38, 39 and a proportional band potentiometer or variable resistor 40, the movable element of which is connected through a coupling resistor 41 to the light sensitive transducer T. The control grid 35 is connected through a fixed resistor 42 to the common junction of the resistors 38, 39 and the cathode 33 is connected through a capacitor 43 to the neutral line 13. The cathode 33 is also connected to a cycle-time potentiometer 44 and a fixed resistors 45 all in the manner as schematically shown in FIGURE 2. A capacitor 46 is shunted across the controlled outlet lines 21–22 to prevent inter-action between the control tube 3 and the pulse tube 31. Also connected across the conductor 17 and the controlled outlet line 22 is a pilot light 47.

In use, the controller A is connected to a suitable source of 120 volt alternating electrical current (not shown) through the lead lines 12–13, and is connected to the light sensitive transducer T and the solenoid valve E, in the manner as schematically shown in FIGURE 1. The conventional light source G is similarly connected to a suitable source of electrical current (not shown). The transducer T and the light source G are then mounted in external relation to a sight glass tube F at the approximate desired liquid level for the vessel B as shown in FIGURE 1. For purposes of illustration, it may be assumed that the vessel B is a reactor used in a chemical process and the inlet line C is connected to some suitable supply of liquid and wherein, it is further desired to maintain a selected liquid level within the vessel B. Thus, the controller A will intermittently open and close the solenoid valve E to maintain the desired liquid level within the vessel B.

By reference to FIGURE 2, it can be seen that the light sensitive transducer T, and the reset potentiometer 28 form a half-bridge and across this bridge the constant D.C. voltage is imposed from the secondary winding 11 and the rectifying circuit. Inasmuch as the center of the half-bridge is connected to the control tube cathode 5 and the reset potentiometer 28 is connected to the control grid 7, through the limiting resistor 29, the grid-to-cathode voltage is dependent upon the position of the reset potentiometer 28 and the current flowing within the half-bridge formed by the potentiometer 28 and the light sensitive transducer T. Thus, a critical voltage in the control tube 3 can be established by adjusting the reset potentiometer 28. Moreover, this critical voltage is preferably adjusted by connecting a vacuum tube voltmeter to the test outlet 30 prior to the operation of the controller A.

As previously described, the amount of light which is incident on the transducer T affects the operation of the control tube 3. In actual operation, the liquid level should rarely shift through a distance where it would be higher than the upper margin of the transducer T or lower than the lower margin of the transducer T. Actually, the liquid level will shift, for the most part, within the limits of the sensitive area of the transducer T. Therefore, a portion of the columnated light beam may pass through the liquid phase and a portion may pass through the vapor phase. However, the amount of light which is incident on the transducer T affects the resistance and therefore affects the operation of the control tube 3.

If the liquid rises above the desired liquid level within the vessel B, a portion of the light beam which was normally in incident upon the transducer T will pass through the liquid phase and hence a larger portion of the light beam will be shifted away from the transducer T, thereby affecting its resistance characteristics. When the liquid level has risen to a point where the amount of light shifted has increased the resistance of the transducer T, and hence lowered the negative grid-cathode voltage differential to a point below the critical grid voltage, the control tube 3 will fire. When the control tube 3 is actuated, the normally open contact points 20 will close and thereby open the normally closed valve E permitting the liquid $l$ to drain from the vessel B through the outlet line D. When the liquid $l$ is drained from the vessel B, the liquid level will be lowered thereby permitting a greater amount of light to pass through the vapor phase and become incident upon the transducer T. When the liquid level has lowered to a point where the amount of light which strikes the transducer T lowers the resistance thereof, so that the negative grid-cathode voltage of the control tube 3 is raised above the critical grid voltage, the control tube 3 will cease firing. As this occurs, the normally open contact points 20 will open, thereby closing the normally closed solenoid valve E and hence cease the draining of liquid $l$ from the vessel B.

Thus, it can be seen, that if the pulse circuit 2 were not provided or if the coupling resistor 41 were of infinite resistance, the control circuit 1 would provide a basic on-off action only. Moreover, it can be seen that the cycle time of the control circuit is determined by the sensitivity of the transducer, the hysteresis of both the control tube 3 and the relay coil 19, the flow rates in the inlet lines C and the outlet line D, and the volume of the process vessel B. For many bench-scale operations, this cycle time is longer than desired to insure a steady flow from the vessel B and yet maintaining constant liquid level therein. The time proportioning action provided by the pulse circuit 2 allows the cycle time to be selected independently of external process conditions and insures a steady flow from the process vessel B.

Time proportioning action is achieved by the addition of a "false" signal to the control circuit 1 so that the control circuit 1 receives a signal that the level of the liquid $l$ is changed even though such is not the case. The "false" signal is in the form of a saw-tooth wave which is impressed across the control tube 3 through the coupling resistor 41 and the half-bridge consisting of the potentiometer 28, transducer T and then through the limiting resistor 29. For the control of liquid levels in bench-scale equipment, it is desirable to maintain a cycle time of 5 to 15 seconds in order to insure a relatively continuous flow of material from the process vessel while maintaining a constant liquid level. However, the pulse circuit 2 of the present invention is adapted to generate saw-tooth wave forms of cycle times from 0.2 second to several minutes. Furthermore, it is desirable to produce a non-linear saw-tooth wave form in order to counteract a basic non-linearity in the light-sensitive transducer T. The pulse circuit 2 of the present invention is therefore adapted to produce a curvature of the saw-tooth wave form.

The circuit including the fixed resistors 38, 42 provide a feed back of a portion of the voltage developed in the pulse tube 31 from the cathode 33 to the control grid 35. The cathode voltage, relative to a neutral voltage, is applied across the capacitor 43, the latter having an effective resistance operating therewith consisting of the parallel combinations of resistors 38, 39, 45 and the potentiometers 40, 44. The fraction of the voltage returned to the grid 35 through the resistor 42 is determined by the ratio of the resistor 38 to the sum of the resistance of resistors 38, 39 and potentiometer 40. The magnitude of this ratio determines the linearity of the saw-tooth wave form produced by the pulse tube 31. Moreover, the cycle time of the pulse which is introduced to the control tube 3 is adjusted by the cycle time potentiometer 44. Only a fraction of the saw-tooth voltage or pulse-voltage is employed and this fraction is selected by positioning of the proportional band potentiometer 40.

In order to describe the operation of the pulse tube 31 and the pulse circuit 2, it can be initially assumed that the pulse tube 31 is in a condition where no power is applied thereto. In this condition, the grid 35 and the cathode 33 are maintained at the same voltage potential. However, when power is applied to the pulse tube 31, the tube 31 will conduct for one cycle of A.C. power supplied, and this conduction supplies a D.C. charging current across the capacitor 43. Inasmuch as the voltage of the cathode is positive with respect to neutral voltage, the voltage returned to the grid, through the feedback circuit, has a higher negative value than the cathode voltage. If the parameters of the pulse tube are properly selected, the grid voltage will have a greater negative value than the critical grid voltage. Thus, a conduction of current for $\frac{1}{120}$ of a second raises the grid voltage above the conduction point so that on the next A.C. current cycle it is not possible for the pulse tube 31 to conduct. However, after the capacitor 43 has been charged, this charge will begin to dissipate by flow through the various resistors in the pulse circuit, thereby producing exponential decay. This decay, of course, will continue until the grid potential reaches a critical value, at which time the cycle will repeat itself.

Thus, it can be seen that the pulse circuit 2 will intermittently supply "false signals" to the control tube 3. These false signals will, in effect, actuate the control circuit 1 in the manner previously described. When the false signal applied to the control tube 3 creates a condition where the negative grid-cathode voltage differential is less than the critical grid voltage, the tube 3 will fire. Similarly, when the negative grid-cathode voltage differential is greater than the critical grid voltage of the control tube 3, the tube will cease firing. Thus, it can be seen that the application of a "false signal" or time-proportioning signal has the same net effect as reducing the light intensity on the transducer T.

It should be understood that the pulse circuit 2 of the present invention can be used with any system where it is desired to employ time proportioning action and that the pulse circuit 2 of the present invention is not limited to use with the control circuit 1. For example, the control circuit 2 could be effectively employed in a cathode-ray tube to produce a raster scan pattern.

It is possible to provide a modified form of liquid level controller A' substantially as shown in FIGURE 3 and which is substantially similar to the previously described liquid level controller A. The liquid level controller A' includes a control circuit 48 and a pulse circuit 49, the former of which includes a 2D–21 thyratron control tube 50 having an anode 51 and a cathode 52, a control grid 53 and a suppressor grid 54. The cathode 52 is directly connected to a lead line 55 and the anode 51 is connected through a limiting resistor 56 to a lead line 57, the lines 55, 57 being connected to a suitable source of 120 volt alternating electrical current (not shown). Interposed in the lead line 57 is an off-on switch 58 and a fuse 59.

Connected across the lead lines 55, 57 is a voltage reduction transformer 60 having a primary winding 61 and a secondary winding 62, the latter being connected to a rectifying circuit 63 consisting of a resistor 64, a diode 65 and a capacitor 66 all connected in the manner as shown in FIGURE 3. It can also be seen that the rectifying circuit is connected to the cathode 52 and the suppressor grid 54, also in the manner as shown in FIGURE 3. The rectifying circuit 63 is furthermore connected to a half-bridge circuit 67 which consists of a reset potentiometer 68 and the light sensitive transducer T. Connected to the common connection of the reset potentiometer 68 and the transducer T and to the cathode 52, is a capacitor 69 which serves to reduce "hum" in the transducer T. The reset potentiometer 68 is connected through a fixed resistor 70 to the control grid 53 of the control tube 50. Thus, with the employment of the capacitor 69, it is possible to obtain grid-coupling without instituting erratic action of the control tube 50.

Interposed between the limiting resistor 56 and the lead line 57 is a relay coil 71 which is energized responsive to a firing of the control tube 50. A capacitor 72 is shunted across the relay coil 71 and when the control tube 50 is conducting a D.C. voltage is developed across the capacitor 72 which, in turn, causes the relay coil 71 to operate. When this occurs, a set of normally closed relay contact points 73 which are connected across the lead lines 55, 57 and are located in close proximity to the relay coil 71 will open, thereby breaking a circuit to a set of controlled outlet lines 74, 75, each of which is respectively connected to the solenoid actuable valve E. Connected across the relay contact points 73 is a capacitor 76. Also connected across the controlled outlet lines 74, 75 is a capacitor 77 and also connected across the outlet lines 74, 75 is a pilot light 78. A test outlet 79 is also provided for connection to the movable element of the reset potentiometer 68 for adjusting the critical voltage of the control tube 50 in the manner as previously described in connection with the liquid level controller A.

The pulse circuit 49 comprises a 2D–21 thyratron pulse tube 80 which includes an anode 81, a cathode 82, a control grid 83 and a suppressor grid 84. The anode 81 is connected through a limiting resistor 85 to the lead line 57, and the cathode 82 is connected through a pair of fixed resistors 86, 87 and through a proportional band potentiometer 88 to the lead line 55. Feedback is provided from the cathode 82 to the control grid 83 through a resistor 89 which is connected to the common connection of resistors 86, 87 and to the control grid 83, in the manner as shown in FIGURE 3. A capacitor 90 is connected across the cathode and the grid for slowing down the approach of the grid voltage thereof to the steady state potential, since the capacitor 90 must be charged by flow through the resistor 89 before the grid voltage can change from zero value.

The cathode 82 is also connected to the movable element of a cycle time potentiometer 91, which is in turn connected to a fixed resistor 92 and to the lead line 55. The cathode 82 is also connected to the suppressor grid 84 to a capacitor 93. Finally, the movable element of the proportional band potentiometer 88 is connected through a coupling resistor 94 to the control grid 53 and to the resistor 70 all in the manner as shown in FIGURE 3.

In use, the lead lines 55, 57 are connected to a suitable source of 120 volt alternating electrical current (not shown). The circuitry of liquid level controller A' works in substantially the same manner as the circuitry of the liquid level controller A. With the use of the capacitor 90, the pulse tube 80 is capable of firing for two consecutive cycles. It has been shown experimentally, that this circuitry is sufficient for the pulse tube 80 to develop its maximum potential value, and this maximum value has a greater repeatability than the value obtained by a single firing of the pulse tube 80. The time constant developed by the resistor 89 and the capacitor 90 determines the number of cycles during which the pulse tube 80 will fire. When the pulse tube 80 is biased to the firing state, the grid-cathode voltage has a zero value during the conducting part of the cycle. However during the non-conducting part of the cycle, the grid-cathode voltage will return to the potential determined by the grid circuitry, which in the present case, is the voltage drop across the resistor 86. The presence of the capacitor 90 will slow the approach of the grid voltage to the steady state value since the capacitor 90 must be charged by flow through the resistor 89 before the grid voltage can change from a zero value. If the RC time constant developed by the resistor 89 and capacitor 90 is sufficiently large, the grid potential will not have reached the critical value during the time period between the end of conduction of one firing cycle and the initiation of the next conducting cycle and therefore will again refire. However on this latter cycle, the charging potential, which is the voltage drop across the resistor 86, is greater than the charging potential of the previous cycle by virtue of charging capacitor 93. Again, if the proper value of the RC constant is selected, the grid voltage will now be high enough to prevent firing on the third cycle. It should be understood, that if too high a value were selected for the RC constant, then the critical grid voltage of the pulse tube 80 could not be reached and the pulse tube would continually fire. However, a reasonably large range of RC values does exist so that two firings are possible without appreciably disturbing the basic pulse shape of the circuit.

Through the pulse circuit previously described, it is now possible to have coupling to the control grid 53 of the control tube 50, since the pulse voltage is completely independent of the operation of the control tube 50. Thus, the changing cycle time of the pulse tube 80 will not change either the set point or the shape of the response curve thereof. Moreover, the pulse voltage is purely an exponential function which materially simplifies the design calculations of the circuit.

It should also be noted, that the operation of the control tube 50 has been reversed with respect to the operation of the control tube 3 in the liquid level controller A. In the liquid level controller A', the control tube 50 will not conduct at high liquid level, when the light sensitive transducer T is experiencing a low light intensity. This is obtained by reversing the relay point action to a normally closed position instead of a normally open position and hence, it is now possible to obtain a more linear response curve.

By reference to FIGURE 3, it can be seen that the amount of light which is incident upon the transducer T affects the firing of the control tube 50. In normal operation, the beam of light from the source G will pass through the wall of the sight glass tube F and refract at a particular angle through the vapor phase, if the liquid is below the lower margin of the transducer T and thereby follow the path of the solid lines in FIGURE 7. Similarly, if the liquid level is above the upper margin of the transducer T, the light beam will pass through the liquid phase and follow the path of the dotted lines in FIGURE 7, thereby shifting the light beam from the transducer T.

If the liquid level within the vessel B raises to a point where the light, which was incident upon the transducer T has been shifted away therefrom so that a large negative voltage differential has been created between the grid 53 and the cathode 52 and which voltage differential is greater than the critical grid voltage of the tube 50, the tube 50 will not fire. When the tube 50 does not fire, the normally closed relay contact points 73 remain closed, thereby permitting the solenoid valve E to open. Opening of the valve E will permit liquid $l$ in the vessel B to drain through the outlet line D. When the liquid level has lowered to a point where the amount of light which is incident upon the transducer T creates a negative grid-cathode voltage differential which is less than the critical grid voltage, the control tube 50 will fire, thereby causing the normally closed relay contact points 73 to open. As the contact points 73 open, the normally closed valve E will close. It can thus be seen that the control tube 50 will continuously fire when a sufficient amount of light is incident upon the transducer T, so that there is a sufficiently small grid-cathode voltage differential which is less than the critical grid voltage. With the liquid level controller A′, it is now possible to indicate the liquid level on an indicating device such as a meter, as well as to control the level. Inasmuch as the operation of the pulse tube 80 has no direct effect on the cathode circuit of the control tube 50, which results from the high resistance coupling, the control voltage is applied across the series combination of the transducer T and the reset potentiometer 68. By measuring the D.C. current flow or the voltage drop across the light sensitive transducer T, a direct measurement of the transducer resistance and hence the liquid level is provided.

Figure 4:
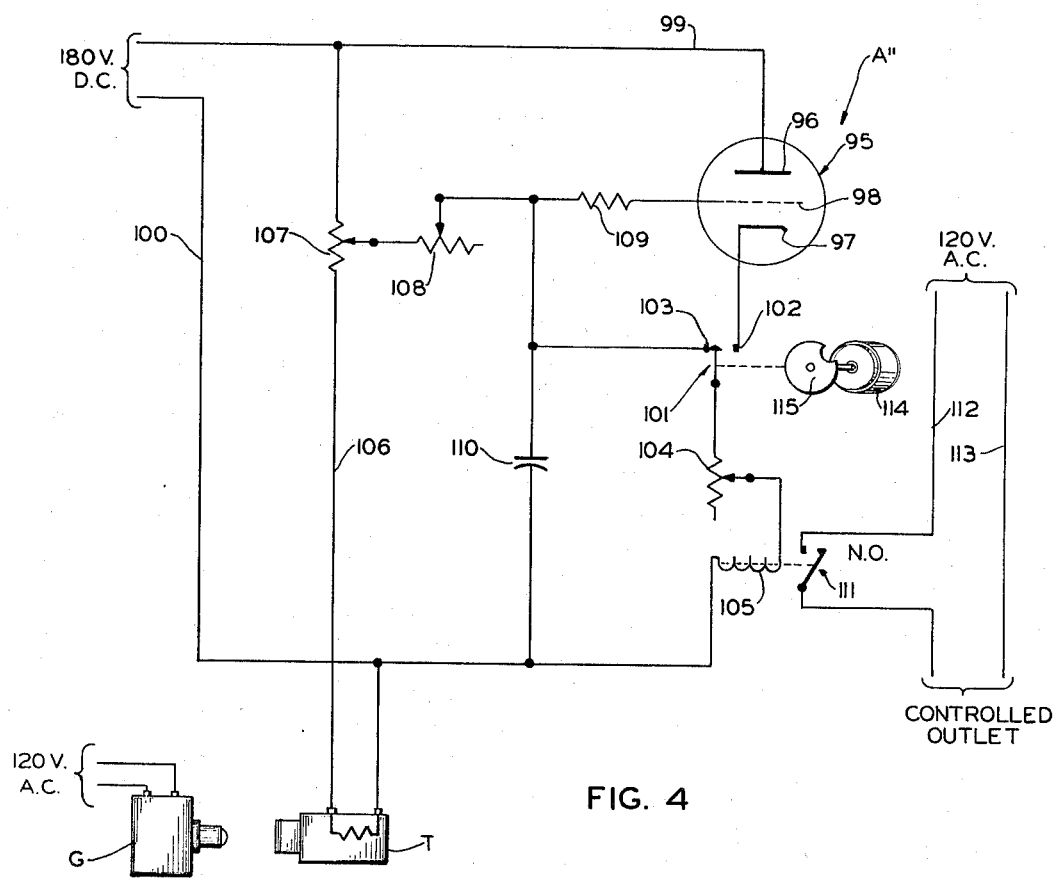
FIGURE 4 is a schematic view of the electrical circuitry of another modified form of liquid level controller and constructed in accordance with and embodying the present invention.

It is possible to produce a modified form of controller A″ substantially as schematically shown in FIGURE 4 and which comprises a 6C4 triode control tube 95 which includes an anode 96, a cathode 97 and a grid 98. The anode 96 and cathode 97 are respectively connected to lead lines 99, 100 which are, in turn, connected to a suitable source of 180 volt direct current (not shown). Interposed between the lead line 100 and the cathode 97 is a two position micro-switch 101 having contacts 102, 103. Also connected across the cathode 97 and lead line 100 is a variable resistor 104 and a relay coil 105.

Connected across the lead lines 99, 100 is a half-bridge 106 consisting of a variable resistor 107 which serves as a reset potentiometer and the light sensitive transducer T. The movable element of the variable resistor 107 is connected to a linearity potentiometer 108, the movable element of the latter being connected through a fixed resistor 109 to the grid 98 of the control tube 95. The linearity potentiometer 108 is adapted to adjust the time constant of the circuit A″. Connected across the common connection of the potentiometer 108 and the resistor 109 and the lead line 100 is a capacitor 110, all of which are schematically shown in FIGURE 4.

The relay coil 105 is disposed in proximate relation to a set of relay contact points 111 which are, in turn, electrically interposed in a controlled outlet line 112, the controlled outlet line 112, with a second outlet line 113 being electrically connected to the solenoid valve E. Time proportioning action is obtained through a synchronous electric motor 114 which operates a cam 115 and which, in turn, shifts the movable element of the micro-switch 101 between the contacts 102 and 103.

In use, the control tube 95 converts the control signals to a current level which is sufficiently high to operate the conventional D.C. relay coil 105. As the light intensity incident on the light-sensitive transducer T increases, the grid voltage becomes more negative to the cathode voltage and when this negative voltage increases beyond a critical grid voltage of the tube 95, the tube 95 will no longer conduct. The time-proportioning action is provided by the micro-switch 101, the potentiometer 108 and the capacitor 110. The movable element of the micro-switch 101 is normally switched to the contact 102 and is designed so that it is maintained in this latter position for approximately 7 seconds. Through the operation of this time regulating means the cam 115 will, upon rotation, shift the movable element to the contact 103 for 0.5 second. During this latter time, while the movable element is shifted to the contact 103, the capacitor 110 will discharge through the resistor 104 and the relay coil 105. Simultaneously with the discharge of the capacitor 110, the cathode circuit of the tube 95 is opened which in turn breaks the circuit to the relay coil 105.

When the movable element of the micro-switch 101 is shifted to the contact 102, the control tube 95 will begin to conduct and the capacitor 110 will charge. At the instant where the control tube 95 begins to conduct, the grid 98 has a ground potential and the cathode 97 has a positive potential with respect to the grid 98, due to the current flow through the resistor 104 and relay coil 105. As the capacitor 110 charges, the grid 98 becomes more positive until current flow is sufficiently high to operate the relay coil 105. Thus, the time proportioning action and the actuation of the relay coil 105 is in effect, determined by the charging rate of the capacitor 110 which in turn, depends not only upon the time constant of the resistor 107, the potentiometer 108 and capacitor 110, but the charging potential of this couple. This, in turn, is dependent upon the resistance of the light transducer T. When a high intensity light is incident upon the transducer T, the charging potential is thus very low, since the center of the half-bridge 106 approaches ground potential. Thus, even at the end of a single time cycle, the grid has not become sufficiently positive to cause the relay coil 105 to operate.

However, when the light sensitive transducer T has no light incident thereupon, the charging potential of the RC couple, namely the potentiometer 108 and the capacitor 110 is maintained at the full D.C. current value between the lines 99, 100.

It, of course, should be understood that the controller A″ is not as sensitive as the controller A or A′, and cannot respond to liquid level changes as rapidly as the controller A or A′. However, the controller A″ does have many operational advantages over each of the aforementioned controllers. The percentage of "on-time" versus the liquid level is quite linear and adjustment of the various potentiometers is less complicated. Moreover, the controller A″ permits adjustments for both high and low light intensity with low interaction between the various adjustments. Although the basic cycle time is determined by the synchronous motor 114, the time constant of the RC couple, namely the potentiometer 108 and capacitor 110 can be adjusted to obtain an almost perfect linear response.

It should also be understood that in each of the aforementioned controllers A, A′ and A″ it would be an obvious modification to substitute solid state devices, such as silicon controlled rectifiers, for the vacuum and gas tubes described therein since each have an emitting means, a collecting means and an electron controlling means. Obviously the cathode of the tube is equivalent to an emitter of the solid state device and is the emitting means; the anode of the tube is equivalent to the collector of the solid state device and is the collecting means; and the grid of the tube is equivalent to a base of the solid state device and is the electron controlling means.

The invention is further illustrated by, but not limited to the following example.

Example 1

Figure 6:
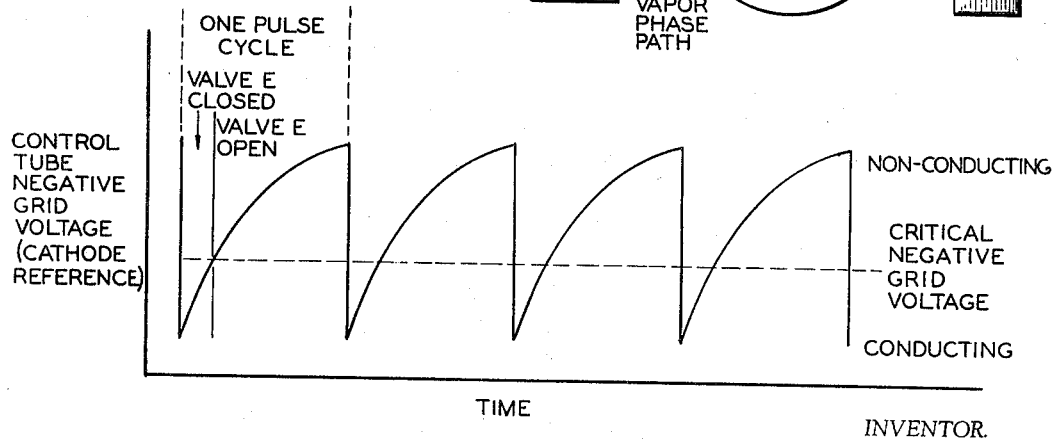
FIGURE 6 is a plot of the wave form of the grid-cathode voltage of a control tube forming part of the controller of FIGURE 3, as a function of time.

The liquid level controller A' was connected to the apparatus of FIGURE 1 in the manner as schematically shown in FIGURE 1. The vessel B was connected to a source of water and filled with approximately 500 milliliters of water. The vessel B was also provided with sight glass tube F and the outlet line D connected thereto was provided with a solenoid actuable valve E. The transducer T and the light source G were located in the manner as schematically shown in FIGURE 6. In FIGURE 7, response curves showing the percent of "on-time" of the controller A' as a function of liquid level in inches has been plotted for four different settings of the control potentiometers. The proportional band was established at 67% of maximum value and the cycle time was maintained at 5 seconds.

Figure 8:
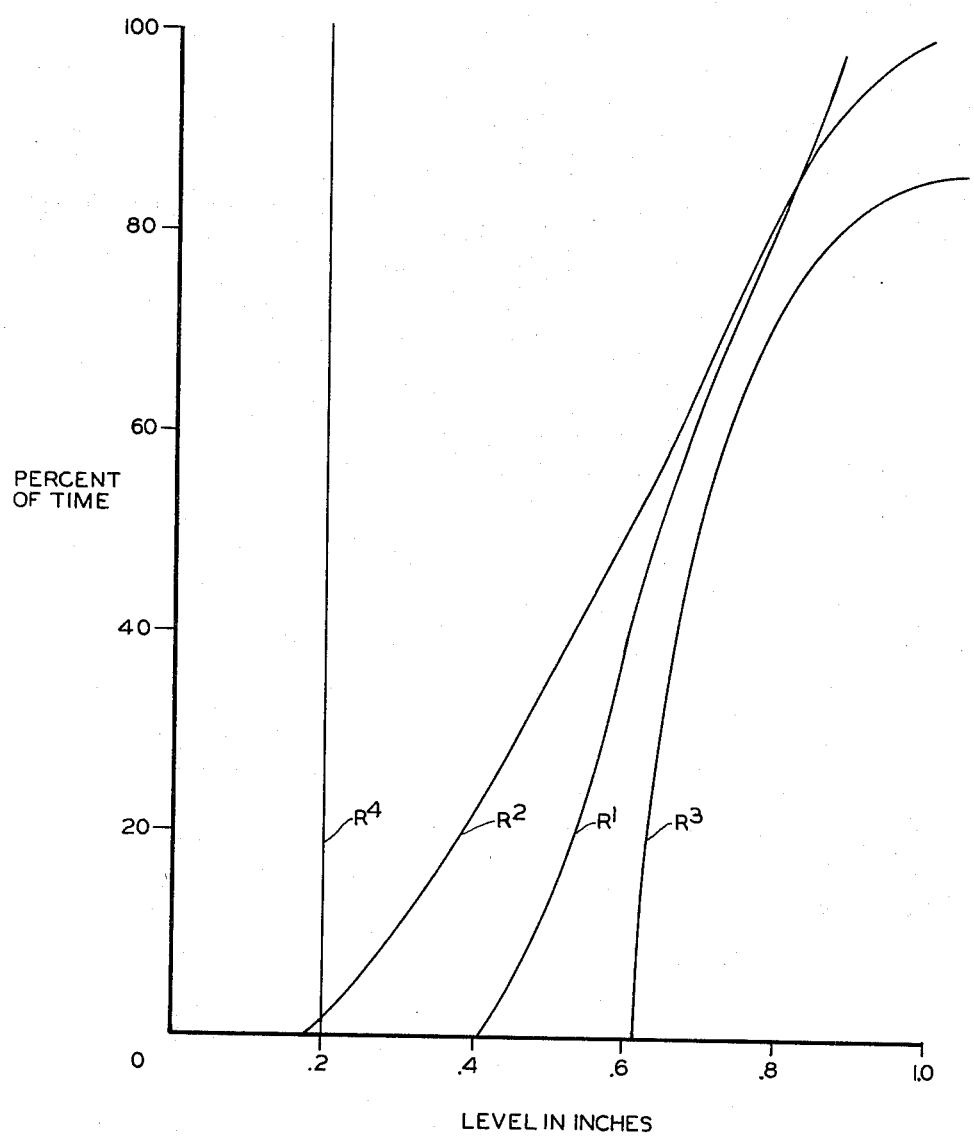
FIGURE 8 is a graph showing response curves of the controller of FIGURE 3 for various settings of a control potentiometer.

To obtain the response curve of FIGURE 8, the control circuit of FIGURE 3 was employed. A Sigma 8RCO1A cadmium sulfide element was employed as the light sensitive transducer.

Each of the resistors in the circuit had the following values:

| Resistor | Resistance, ohms | Watts |
|---|---|---|
| 56 | 3.9K | 2 |
| 64 | 27 | ½ |
| 70 | 1.0M | ½ |
| 68 | 100K | 2 |
| 89 | 2.2M | ½ |
| 86 | 100K | ½ |
| 87 | 1.0M | ½ |
| 88 | 250K | 2 |
| 94 | 4.7M | ½ |
| 92 | 100K | ½ |
| 91 | 1.0M | 2 |
| 85 | 150 | 2 |

Each of the capacitors in the circuit had the following values:

| Capacitor | Microfarad | Volts | Type |
|---|---|---|---|
| 72 | 12 | 150 | Electrolytic. |
| 66 | 5 | 50 | Do. |
| 77 | 0.5 | 150 | Tubular. |
| 93 | 16 | 150 | Electrolytic. |
| 76 | 0.10 | 400 | Tubular. |
| 69 | 1.0 | 50 | Do. |
| 90 | 0.1 | 400 | Do. |

The recommended normal operating curve is that curve in FIGURE 7 labeled $R^1$ which is linear from approximately zero to a 90% "on-time" and yields a 0.46" proportional band. The settings of the reset potentiometer 68 are calibrated as a percent of resistance between the fixed resistor 70 and the transducer T. When the reset potentiometer 68 was maintained at 11.9%, the curve $R^1$ was obtained.

When the reset potentiometer 68 was maintained at 17.6% the curve $R^2$ was obtained. When the reset potentiometer 68 was maintained at a 0% of resistance between the resistor 70 and the transducer T, curve $R^3$ was obtained and when the reset potentiometer was maintained at 11.9% with a 0% proportional band, the curve $R^4$ was obtained. Curves $R^2$ and $R^3$ were obtained with the same setting of the proportional band potentiometer as the curve $R^1$. It can therefore be seen that the reset potentiometer affects the lower end of the curve more than the upper end thereof, so that in effect the proportional band is also changed. If desired, the proportional band potentiometer can be changed simultaneously with the reset potentiometer to obtain linear curves which would be parallel to the curve $R^1$.

A two-day test conducted with the liquid level controller R' has shown this circuit to be very stable. During this two-day period, the set point drifted only 0.02" from the entire response curve. Moreover, the circuit was unaffected by line voltage changes from 90 to 140 volts.

It should be understood that changes and modifications in the form, construction, arrangement, and combination of parts presently described and pointed out may be made and substituted for those herein shown without departing from the nature and principle of my invention.

Having thus described my invention, what I desire to claim and secure by Letters Patent is:

1. A time proportioning controller comprising in combination electromagnetic sensing means for detecting a change in a controlled function, a control tube having an anode, a cathode and a grid, a source of alternating current voltage for powering said tube, means for applying a bias voltage across the grid-cathode circuit of said tube, said sensing means being adapted to change its resistance characteristics responsive to changes in emission incident thereupon and thereby affect the bias voltage in said control tube and render said tube in a conductive state where a corrective pulse is initiated, and false signal means operatively connected to the grid-cathode circuit of said control tube for transmitting a false signal to said control tube and thereby initiate a corrective signal independently of the action of said sensing means.

2. A pulse circuit for producing a saw-tooth wave form signal, said circuit comprising an electronic control device comprising emitting means, collecting means and electron control means, a source of electrical current operatively connected to said device for powering said device and causing said device to conduct during a power cycle, a resistance-capacitance couple in the emitting means circuit of said device, means connecting the resistance-capacitance couple to said collecting means to discharge and generate a saw-tooth wave form and a feedback circuit operatively connecting the emitting means circuit to the electron control means circuit of said tube for feeding back a portion of the voltage developed across the emitting means circuit to the electron control means of said device, said resistance-capacitance electron control means circuit including a first variable resistor for regulating the linearity of said saw-tooth wave form, said electron control means circuit also including a second variable resistor for regulating the cycle time of said saw-tooth wave form.

3. A time proportioning controller comprising in combination electromagnetic sensing means for detecting a change in a controlled function, an electronic control device comprising emitting means, collecting means and electron control means, a source of alternating current voltage for powering said device, means for applying a bias voltage across the emitting means, electron control means circuit of said device, said sensing means being adapted to change its resistance characteristics responsive to changes in emission incident thereupon and thereby affect the bias voltage in said device and render said device in a conductive state where a corrective impulse is initiated, and false signal means operatively connected to the emitting means, electron control means circuit of said control device for transmitting a false signal to said control device and thereby initiate a corrective signal independently of the action of said sensing means.

4. A control circuit comprising sensing means for detecting a change in a controlled function, a control tube comprising an anode, a cathode and a grid, switch means connected to the grid-cathode circuit of said tube, first resistor means having one terminal connected to said switch means, a source of electrical current connected to the other terminal of said first resistor means and to the anode of said tube, second resistor means having one terminal connected to said sensing means and the other terminal to said source of electrical current, said sensing means having its other terminal connected across said source of electrical current, third resistor means having one terminal connected to said second resistor means and the other terminal connected to the grid of said tube, a capacitor connected to the common connection of said second and said third resistor means and having its other terminal connected to said source of electrical current, and timing means operatively associated with said switch means for closing said switch means at selected time intervals and thereby creating a corrective signal.

5. The control circuit of claim 4 further characterized in that the first resistor means is a variable resistor, the second resistor means is a variable resistor and that the third resistor means includes a variable resistor and a fixed resistor.

6. A control circuit comprising sensing means for detecting a change in a controlled function, a control tube comprising an anode, a cathode and a grid, a source of electrical current connected across said control tube for supplying power thereto, a resistor-capacitor control circuit operatively connected to the grid-cathode circuit of said control tube, switch means operatively connected to said resistor-capacitor circuit and being adapted to discharge the capacitor and thereby generate a saw-tooth wave form, said capacitor and switch means being connected to the control tube to very the grid voltage of said tube at selected time intervals during the closing of said switch, means connecting said sensing means to said resistor-capacitor circuit for varying the slope of said saw-tooth wave form in proportion to the change of the controlled function, and timing means operatively associated with said switch means for closing same at these selected time intervals, whereby the closing of said switch means will cause discharge of said capacitor and cause said tube to inititate a control signal.

7. A control circuit comprising sensing means for detecting a change in a controlled function, a control tube comprising an anode, a cathode and a grid, a source of electrical current connected across said control tube for supplying power thereto, a resistor-capacitor control circuit operatively connected to the grid-cathode circuit of said control tube, switch means operatively connected to said resistor-capacitor circuit and being adapted to discharge the capacitor and thereby generate a saw-tooth wave form, said capacitor and switch means being connected to the control tube to vary the grid voltage of said tube at selected time intervals during the closing of said switch, means connecting said sensing means to said resistor-capacitor circuit for varying the slope of said saw-tooth wave form in proportion to the change of the controlled function, potentiometer means operatively connected to said sensing means and resistor-capacitor circuit for adjusting the time constant of said control circuit, and timing means operatively associated with said switch means for closing same at these selected time intervals, whereby the closing of said switch means will cause discharge of said capacitor and cause said tube to initiate a control signal.

8. The control circuit of claim 7 further characterized in that the sensing means has radiation incident thereupon at least a portion of the time of operation of said control circuit and that the charging potential of the capacitor is a function of the intensity of the radiation incident on the sensing means.

9. A control circuit comprising sensing means for detecting a change in a controlled function, an electronic control device comprising emitting means, collecting means and electron control means, a source of electrical current connected across said device for supplying power thereto, a resistor-capacitor control circuit operatively connected to the collecting means-electron control means circuit of said electronic control device, switch means operatively connected to said resistor-capacitor circuit and being adapted to discharge the capacitor and thereby vary the electron control means voltage of said device at selected time intervals during the closing of said switch, means connecting said sensing means to said resistor-capacitor circuit for varying the slope of said saw-tooth wave form in proportion to the change of the controlled function, and timing means operatively associated with said switch means for closing same at these selected time intervals, whereby the closing of said switch means will cause discharge of said capacitor and cause said device to initiate a control signal.

10. A pulse circuit for producing a time-proportioning signal, said circuit comprising a gas-filled tube having an anode, a cathode and a grid, a source of electrical current operatively connected to said tube for powering said tube, a capacitor connected across the grid and cathode of said tube, a first resistor having one terminal connected to one terminal of said capacitor, a second resistor having one terminal connected to opposite terminal of said capacitor, said first and second resistors having their opposite terminals connected to each other, a third resistor having one terminal connected to the common connection of said first and second resistors, a fourth resistor having one terminal connected to the other terminal of said third resistor, and a resistor-capacitor circuit having one terminal connected to the other terminal of the fourth resistor, the other terminal of said resistor-capacitor circuit being connected to the cathode of said tube.

11. A pulse circuit for producing a time-proportioning signal, said circuit comprising a gas-filled tube having an anode, a cathode and a grid, a source of electrical current operatively connected to said tube for powering said tube, a first capacitor connected across the grid and cathode of said tube, a first resistor having one terminal connected to one terminal of said first capacitor, a second resistor having one terminal connected to opposite terminal of said first capacitor, said first and second resistors having their opposite terminals connected to each other, a third resistor having one terminal connected to the common connection of said first and second resistors, a fourth resistor having one terminal connected to the other terminal of said third resistor, a second capacitor connected to the other terminal of said fourth resistor, the other terminal of said second capacitor being connected to the cathode of said tube, a fifth resistor and a sixth resistor being connected in series to each other and having their opposite terminals connected across said second capacitor.

12. A pulse circuit for producing a time-proportioning signal, said circuit comprising a gas-filled tube having an anode, a cathode and a grid, a source of electrical current operatively connected to said tube for powering said tube, connector means connecting said grid and cathode, a first resistor having one terminal connected to said last named means, a second resistor having one terminal connected to the other terminal of said first resistor, a capacitor having one terminal operatively connected to the other terminal of said second resistor, the other terminal of said capacitor being connected to the common connector of said first resistor and said connector means, and a third resistor having a feedback circuit and having one terminal connected to the common connection of said first and second resistors, the other terminal of said third resistor being connected to the grid of said tube.

13. The pulse circuit of claim 12 further characterized in that a variable resistor is interposed between said second resistor and said capacitor.

14. A pulse circuit for producing a time-proportioning signal, said circuit comprising a gas-filled tube having an anode, a cathode and a grid, a source of electrical current operatively connected to said tube for powering said tube, connector means connecting said grid and cathode, a first resistor having one terminal connected to said last named means, a second resistor having one terminal connected to the other terminal of said first resistor, a capacitor having one terminal operatively connected to the other terminal of said second resistor, the other terminal of said capacitor being connected to the common connector of said first resistor and said connector means, a third resistor having a feedback circuit and having one terminal connected to the common connection of said first and second resistors, the other terminal of said third resistor being connected to the grid of said tube, and a variable resistor connected across the opposite terminals of said capacitor.

15. A time proportioning controller comprising in combination sensing means for detecting a change in a controlled function, a control tube having an anode, a cathode and a grid, a source of alternating current voltage for powering said tube, said sensing means having one terminal connected to the cathode of said control tube, a half bridge circuit connected across the grid circuit of said control tube, said half bridge circuit including a first resistor having one terminal connected to a grid of said tube and a second resistor connected to a grid of said tube, the other terminals of said first and second resistors being connected together, the other terminal of said sensing means being connected to the common connection of said first and second resistor means, a rectifying circuit for applying a bias voltage across the grid-cathode circuit of said tube, said sensing means being adapted to change its resistance characteristics responsive to changes in emission incident thereupon and thereby affect the bias voltage in said control tube and render said tube in a conductive state where a corrective pulse is initiated, actuating means connected to the anode of said control tube and being operable by conduction of said control tube, and false signal means operatively connected to grid-cathode circuit of said control tube for transmitting a false signal to said control tube, and thereby initiate a corrective signal independently of the action of said sensing means.

16. The time proportioning controller of claim 15 further characterized in that the actuating means comprises a relay which actuates contacts in a controlled outlet line.

17. A time proportioning controller comprising in combination sensing means for detecting a change in a controlled function, a control tube having an anode, a cathode and a grid, a source of alternating current voltage for powering said tube, said sensing means having one terminal connected to the cathode of said control tube, a half bridge circuit connected across the grid-cathode circuit of said control tube, said half bridge circuit including a first resistor having one terminal connected to a grid of said tube and a second resistor connected to a grid of said tube, the other terminals of said first and second resistor being connected together, the other terminal of said sensing means being connected to the common connection of said first and second resistor means, a rectifying circuit for applying a bias voltage across the grid-cathode circuit of said tube, said sensing means being adapted to change its resistance characteristics responsive to changes in emission incident thereupon and thereby affect the bias voltage in said control tube and render said tube in a conductive state where a corrective pulse is initiated, actuating means connected to the anode of said control tube and being operable by conduction of said control tube, false signal means operatively connected to grid-cathode circuit of said control tube for transmitting a false signal to said control tube, and thereby initiate a corrective signal independently of the action of said sensing means, controlled outlet means connected to said actuating means and to said false signal means, capacitor means connected across said actuating means and said false signal means to prevent interaction of said false signal means and said control tube, means associated with the false signal means for regulating the cycle time of said false signal, and means for adjusting the amplitude of said false signal and thereby alter the proportional band of the control signal initiated by said control tube.

18. The time proportioning controller of claim 17 further characterized in that the control tube will conduct when the negative grid-cathode voltage differential is less than the critical grid voltage of said tube.

19. A time proportioning controller comprising in combination sensing means for detecting a change in a controlled function, a control tube having an anode, a cathode and a grid, a source of alternating current voltage for powering said tube, said sensing means having one terminal connected to the cathode of said control tube, a half bridge circuit connected across the grid-cathode circuit of said control tube, said half bridge circuit including a first resistor having one terminal connected to a grid of said tube and a second resistor connected to a grid of said tube, the other terminals of said first and second resistors being connected together, the other terminal of said sensing means being connected to the common connection of said first and second resistor means, a rectifying circuit for applyig a bias voltage across the grid-cathode circuit of said tube, said sensing means being adapted to change its resistance characteristics responsive to changes in emission incident thereupon and thereby affect the bias voltage in said control tube and render said tube in a conductive state where a corrective pulse is initiated, actuating means connected to the anode of said control tube and being operable by conduction of said control tube, a pulse tube having an anode, a cathode and a grid, means connecting the pulse tube to said source of electrical current for powering said pulse tube and causing said tube to conduct during a power cycle, a resistance-capacitance couple in the cathode circuit of said pulse tube, means connecting the resistance-capacitance couple to the cathode of said pulse tube permitting said capacitor to discharge and generate a saw-tooth wave form, a feedback circuit operatively connecting the cathode circuit to the grid circuit of said pulse tube for feeding back a portion of the voltage developed across the cathode circuit to the grid of said pulse tube, and means operatively connecting the resistance-capacitance circuit of said pulse tube to the half bridge circuit of said control tube for transmitting the saw-tooth wave form signals to the control tube and thereby initiate a corrective signal independently of the action of said sensing means.

20. A time proportioning controller comprising in combination sensing means for detecting a change in a controlled function, a control tube having an anode, a cathode and a grid, a source of alternating current voltage for powering said tube, said sensing means having one terminal connected to the cathode of said control tube, a half bridge circuit connected across the grid-cathode circuit of said control tube, said half bridge circuit including a first resistor having one terminal connected to a grid of said tube and a second resistor connected to a grid of said tube, the other terminals of said first and second resistors being connected together, the other terminal of said sensing means being connected to the common connection of said first and second resistor means, a rectifying circuit for applying a bias voltage across the grid-cathode circuit of said tube, said sensing means being adapted to change its resistance characteristics responsive to changes in emission incident thereupon and thereby affect the bias voltage in said control tube and render said tube in a conductive state where a corrective pulse is initiated, actuating means connected to the anode of said control tube and being operable by conduction of said control tube, a pulse tube having an anode, a cathode and a grid, means connecting the pulse tube to said source of electrical current for powering said pulse tube and causing said tube to conduct during a power cycle, a resistance-capacitance couple in the cathode circuit of said pulse tube, means connecting the resistance-capacitance couple to the cathode of said pulse tube permitting said capacitor to discharge and generate a saw-tooth wave form, a feedback circuit operatively connecting the cathode circuit to the grid circuit of said pulse tube for feeding back a portion of the voltage developed across the cathode circuit to the grid of said pulse tube, said resistance-capacitance cathode circuit including a first variable resistor for regulating the linearity of said saw-tooth wave form, said cathode circuit also including a second variable resistor for regulating the cycle time of said saw-tooth wave form, and means operatively connecting the resistance-capacitance circuit of said pulse tube to the half bridge circuit of said control tube for transmitting the saw-tooth wave form signals to the control tube and thereby initiate a corrective signal independently of the action of said sensing means.

21. A time proportioning controller comprising in combination sensing means for detecting a change in a controlled function, a control tube having an anode, a cathode and a grid, a source of alternating current voltage for powering said tube, said sensing means having one terminal connected to the cathode of said control tube, a half bridge circuit connected across the grid-cathode circuit of said control tube, said half bridge circuit including a first resistor having one terminal connected to a grid of said tube and a second resistor connected to a grid of said tube, the other terminals of said first and second resistors being connected together, the other terminal of said sensing means being connected to the common connection of said first and second resistor means, a rectifying circuit for applying a bias voltage across the grid-cathode circuit of said control tube, said sensing means being adapted to change its resistance characteristics responsive to changes in emission incident thereupon and thereby affect the bias voltage in said control tube and render said tube in a conductive state where a corrective pulse is initiated, actuating means connected to the anode of said control tube and being operable by conduction of said control tube, a pulse tube having an anode, a cathode and a grid, means connecting said pulse tube to said source of alternating current voltage for powering said pulse tube and causing said tube to conduct during one A.C. power cycle, a resistance-capacitance couple in the cathode circuit of said pulse tube, means connecting the resistance-capacitance couple to the cathode of said pulse tube for transmitting a D.C. charging current developed by said pulse tube to said capacitor permitting the capacitor in said resistance-capacitance couple to discharge in the form of an exponential decay, additional resistor means in said resistance-capacitance couple permitting said exponential decay to form a saw-tooth wave form signal, the cathode voltage of said pulse tube being positive with respect to the neutral, said grid voltage being more negative than the cathode voltage and the critical grid voltage of said pulse tube, a feedback circuit operatively connecting the cathode circuit to the grid circuit of said pulse tube for feeding back a portion of the voltage developed across the cathode circuit to the grid of said pulse tube, and means operatively connecting the resistance-capacitance circuit of said pulse tube to the half bridge circuit of said control tube for transmitting the saw-tooth wave form signals to the control tube and thereby initiate a corrective signal independently of the action of said sensing means.

22. A time proportioning controller comprising in combination sensing means for detecting a change in a controlled function, a control tube having an anode, a cathode and a grid, a source of alternating current voltage for powering said tube, said sensing means having one terminal connected to the cathode of said control tube, a half bridge circuit connected across the grid-cathode circuit of said control tube, said half bridge circuit including a first resistor having one terminal connected to a grid of said tube and a second resistor connected to a grid of said tube, the other terminals of said first and second resistors being connected together, the other terminal of said sensing means being connected to the common connection of said first and second resistor means, a rectifying circuit for applying a bias voltage across the grid-cathode circuit of said tube, said sensing means being adapted to change its resistance characteristics responsive to changes in emission incident thereupon and thereby affect the bias voltage in said control tube and render said tube in a conductive state where a corrective pulse is initiated, actuating means connected to the anode of said control tube and being operable by conduction of said control tube, a pulse tube having an anode, a cathode and a grid, means connecting said pulse tube to said source of alternating current voltage for powering said pulse tube and causing said tube to conduct during one A.C. power cycle, a resistance-capacitance couple in the cathode circuit of said pulse tube, means connecting the resistance-capacitance couple to the cathode of said pulse tube for transmitting a D.C. charging current developed by said pulse tube to said capacitor permitting the capacitor in said resistance-capacitance couple to discharge in the form of an exponential decay, additional resistor means in said resistance-capacitance couple permitting said exponential decay to form a saw-tooth wave form signal, the cathode voltage of said pulse tube being positive with respect to the neutral, said grid voltage being more negative than the cathode voltage and the critical grid voltage of said pulse tube, a feedback circuit operatively connecting the cathode circuit to the grid circuit of said pulse tube for feeding back a portion of the voltage developed across the cathode circuit to the grid of said pulse tube, said resistance-capacitance couple including a first variable resistor for regulating the linearity of said saw-tooth wave form, the cathode circuit of said pulse tube also including a second variable resistor for regulating the cycle time of said saw-tooth wave form, and means operatively connecting the resistance-capacitance circuit of said pulse tube to the half bridge circuit of said control tube for transmitting the saw-tooth wave form signals to the control tube and thereby initiate a corrective signal independently of the action of said sensing means.

23. A pulse circuit for producing a time-proportioning signal, said circuit comprising a gas-filled tube having an anode, a cathode and a grid, a source of electrical current operatively connected to said tube for powering said tube, a capacitor connected across the grid and cathode of said tube, said tube developing a D.C. charging current, a first resistor having one terminal connected to one terminal of said capacitor, a second resistor having one terminal connected to opposite terminal of said capacitor, said first and second resistors having their opposite terminals connected to each other, a third resistor having one terminal connected to the common connection of said first and second resistors, a fourth resistor having one terminal connected to the other terminal of said third resistor, and a resistor-capacitor circuit having one terminal connected to the other terminal of the fourth resistor, the other terminal of said resistor-capacitor circuit being connected to the cathode of said tube, said capacitor having its charge dissipated in the form of an exponential decay creating a saw-tooth wave form.

24. The pulse circuit of claim 23 further characterized in that said saw-tooth wave form is non-linear.

25. A pulse circuit for producing a time-proportioning signal, said circuit comprising a gas-filled tube having an anode, a cathode and a grid, a source of electrical current operatively connected to said tube for powering said tube, said tube developing a D.C. charging current, connector means connecting said grid and cathode, a first resistor having one terminal connected to said last named means, a second resistor having one terminal connected to the other terminal of said first resistor, a capacitor having one terminal operatively connected to the other terminal of said second resistor, the other terminal of said capacitor being connected to the common connector of said first resistor and said connector means, and a third resistor having a feedback circuit and having one terminal connected to the common connection of said first and second resistors, the other terminal of said third resistor being connected to the grid of said tube, said capacitor having its charge dissipated in the form of an exponential decay creating a saw-tooth wave form.

26. The pulse circuit of claim 25 further characterized in that said saw-tooth wave form is non-linear.

References Cited by the Examiner

UNITED STATES PATENTS

| | | | |
|---|---|---|---|
| 2,625,653 | 1/1953 | Wouters | 328—2 |
| 2,627,025 | 1/1953 | Trembly | 328—169 |
| 2,684,448 | 7/1954 | Nilles | 331—129 |
| 2,686,263 | 8/1954 | Konick | 328—310 |
| 2,732,494 | 1/1956 | Hall | 328—169 |
| 2,879,456 | 3/1959 | Pickaers | 307—88.5 |
| 2,923,850 | 2/1960 | Raffensperger | 328—184 |
| 2,944,217 | 7/1960 | Greainias | 328—2 |
| 2,999,511 | 9/1961 | Chew | 137—392 |
| 3,002,113 | 9/1961 | Winn | 307—106 |
| 3,127,522 | 3/1964 | Thorndyke | 307—88.56 |
| 3,142,309 | 7/1964 | Minkler | 137—392 |
| 3,149,245 | 9/1964 | Barnes et al. | 307—106 |

FOREIGN PATENTS 810,501  3/1937  France.

ARTHUR GAUSS, *Primary Examiner.*

B. P. DAVIS, *Assistant Examiner.*

UNITED STATES PATENT OFFICE
CERTIFICATE OF CORRECTION

Patent No. 3,311,834                      March 28, 1967

George E. Barker

It is certified that error appears in the above identified patent and that said Letters Patent are hereby corrected as shown below:

Column 2, line 55, for "thryatron" read -- thyratron --; column 4, line 65, for "resistors" read -- resistor --; column 5, line 46, strike out "in"; column 13, line 32, for "very" read -- vary --; column 16, line 5, for the claim reference numeral "17" read -- 15 --.

Signed and sealed this 22nd day of July 1969.

(SEAL)
Attest:

Edward M. Fletcher, Jr.                    WILLIAM E. SCHUYLER, JR.
Attesting Officer                            Commissioner of Patents